United States Patent [19]

Higashino

[11] Patent Number: 4,493,014

[45] Date of Patent: Jan. 8, 1985

[54] SUPERCONDUCTION STORAGE APPARATUS OF ELECTRICAL POWER

[75] Inventor: Shigenori Higashino, Itami, Japan

[73] Assignee: Mitsubishi Denki Kabushiki Kaisha, Tokyo, Japan

[21] Appl. No.: 384,171

[22] Filed: Jun. 2, 1982

[30] Foreign Application Priority Data

Jun. 3, 1981 [JP] Japan .................. 56-87278

[51] Int. Cl.³ ............................... H02J 15/00
[52] U.S. Cl. ..................... 363/14; 363/129; 363/137
[58] Field of Search .................. 363/14, 44–48, 363/128–130, 136–137; 307/306

[56] References Cited

U.S. PATENT DOCUMENTS

| | | | |
|---|---|---|---|
| 3,983,469 | 9/1976 | Brown ..................... | 363/48 |
| 4,053,820 | 10/1977 | Peterson et al. ............ | 363/48 X |
| 4,122,512 | 10/1978 | Peterson et al. ............ | 363/14 |

FOREIGN PATENT DOCUMENTS 462243 11/1975 U.S.S.R. ................. 363/14

OTHER PUBLICATIONS

Proc. Annu. UMR DNR Conf. Energy 6th, 1979, pp. 448–457.
IEEE Power Engineering Review, Feb. 1982, Front Page, and pp. 2–3.

Primary Examiner—Peter S. Wong
Attorney, Agent, or Firm—Wenderoth, Lind & Ponack

[57] ABSTRACT

A superconduction power storage apparatus includes a superconduction coil for storage and release of electrical energy, and a separately excited thyristor conversion unit having d.c. terminals connected to the said superconduction coil and a.c. terminals connected to an a.c. power source. The conversion unit is arranged so as to convert the electrical energy from a d.c. form to an a.c. form and vice versa between the superconduction coil and the a.c. power source. An on-load voltage regulator is connected between the a.c. side terminals of the thyristor conversion unit and the a.c. power source, and is arranged for adjusting the voltage appearing at the a.c. terminals of the thyristor conversion unit.

1 Claim, 2 Drawing Figures

SUPERCONDUCTION STORAGE APPARATUS OF ELECTRICAL POWER

BACKGROUND OF THE INVENTION

This invention relates to a superconduction storage apparatus of electrical power with an improved operating efficiency.

FIG. 1 shows an example of a conventional superconduction power storage apparatus. In FIG. 1, the reference numeral 1 designates a superconduction coil for storage and release of electrical energy; reference numeral 2 designates a separately excited thyristor conversion unit having a.c. terminals and d.c. terminals; reference numeral 3 designates an a.c. power source. The thyristor conversion unit 2 has its d.c. terminals 4 connected directly to the superconduction coil 1 and has its a.c. terminals 5 connected to the a.c. power source 3 by way of a transformer 6.

The operation of the conventional storage apparatus shown in FIG. 1 is as follows. The a.c. power from the a.c. power source 3 is converted into d.c. power by the conversion unit 2 and supplied to the superconduction coil 1 for storage, the thyristor conversion unit 2 then operating as a forward conversion apparatus.

The d.c. electrical energy thus stored in the superconduction coil 1 is released into the a.c. power source as a.c. power by the reverse conversion operation of the thyristor conversion unit 2.

Such storage and release of the electrical energy may be controlled by adjusting the d.c. terminal voltage of the thyristor conversion unit 2 by the phase control of the thyristor conversion unit 2, thereby changing the d.c. voltage applied to the superconduction coil 1.

As the d.c. voltage of the thyristor conversion unit 2 is applied to the coil 1, a ripple current flows due to voltage ripple contained in such a d.c. voltage, thus causing an eddy current loss due to such a ripple current. This eddy current loss may raise the temperature of the superconduction coil 1 and may eventually give rise to destruction of the superconduction state of the coil 1. Hence, the coil 1 must be cooled by a cooling apparatus which is not shown.

In the case of using a liquid helium at 4° K. or thereabouts as a cooling medium for the superconduction coil 1, the removal of heat quantity of 1 joule requires an energy of about 300 times that value.

Hence, in the superconduction power storage apparatus, the magnitude of the d.c. voltage ripple applied to the superconduction coil 1 affects the operating efficiency of the apparatus.

In this consideration, the superconduction power storage apparatus of the prior art has such a drawback that, since the voltage applied to the superconduction coil 1 is adjusted in its entirety by the phase control of the thyristor control unit 2, the lesser the absolute value of the electrical voltage applied to the coil 1, the larger is the voltage ripple, thus causing an increased eddy current loss in the coil 1 and an increased cooling load.

SUMMARY OF THE INVENTION

It is therefore an object of the present invention to overcome such a deficiency of the conventional superconduction power storage apparatus and to reduce the voltage ripple of the thyristor conversion unit for reducing the eddy current loss in the superconduction coil and saving the energy required for the cooling of the superconduction coil.

DESCRIPTION OF A PREFERRED EMBODIMENT

Figure 2:
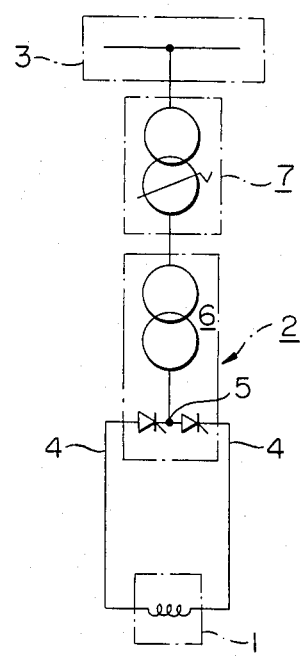
FIG. 2 is a schematic wiring diagram showing a superconduction power storage apparatus according to a preferred embodiment of the present invention.

Reference is made to FIG. 2 illustrating a preferred embodiment of the present invention.

Figure 1:
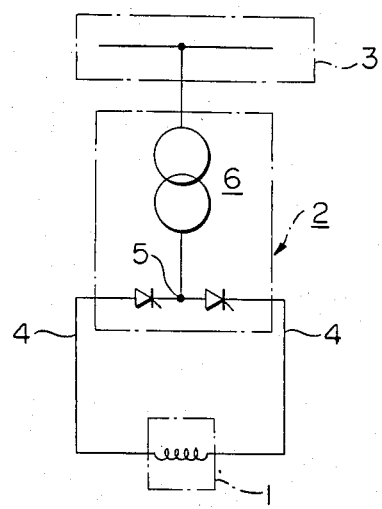
FIG. 1 is a schematic wiring diagram showing an example of the conventional superconduction power storage apparatus.

The sole distinction of the FIG. 2 embodiment from the superconduction power storage apparatus shown in FIG. 1 is that an on-load voltage regulator 7 is interposed between the a.c. terminals 5 of the conversion unit 2 and the a.c. power source 3 for controlling the a.c. terminals 5 of the conversion unit 2.

Hence, control of the mean d.c. output voltage of the thyristor conversion unit 2 may be effected not only by the phase control of the thyristor conversion unit, that is, by adjustment of the gate firing phase angle (phase lag angle $\alpha$) of the thyristor conversion unit, but also by adjustment of the a.c. voltage supplied to the a.c. terminals 5 of the unit 2 by means of the on-load voltage regulator 7 and thus without regard to the prevailing phase lag angle $\alpha$ of the unit 2 which may be fixed at a occasionally adjusted value.

The magnitude of the electrical power P transmitted between the coil 1 and the power source 3 may be obtained as product of the d.c. output voltage Ed of the thyristor conversion unit 2 and the current Id flowing in the coil 1, where $Id \geq 0$. Thus, $$P = Ed[V] \times Id[A]$$

with $P \geq 0$ for power storage in the superconduction coil and $P \leq 0$ for release of power from the superconduction coil.

The output voltage Ed of the thyristor conversion unit 2 is the product of the ideal d.c. output voltage Edo (where $Edo > 0$) determined by the wiring method of the thyristor conversion unit 2 (see JEC-188 and -144 standards set forth by the Japanese Electrotechnical Committee) and the cosine of the phase lag angle $\alpha$. Assuming that no power loss is caused in the thyristor conversion unit 2 and the commutation overlap angle u is zero, then the phase lag angle $\alpha$ is within a range such that $0° \leq \alpha \leq 180°$. Thus, $$Ed = Edo \cdot \cos \alpha$$

The condition $\cos \alpha > 0$ is referred to as forward conversion range wherein the electrical power is directed from the power source 3 towards the superconduction coil 1 for storage in the coil. The condition $\cos \alpha < 0$ is referred to as reverse conversion range where the electrical power is released from the superconduction coil 1 towards the power source 3.

According to the present invention, the a.c. input voltage to the thyristor conversion unit may be controlled by the on-load voltage regulator and hence the value of the ideal d.c. output voltage Edo may be raised or lowered as desired in dependence upon the output voltage of the on-load voltage regulator. Hence, the amplitude of the d.c. output voltage ripple itself may be changed with changes in the d.c. output voltage thus enabling the percentage of the voltage ripples contained in the d.c. output voltage to be controlled as desired. Such an adjustment of the a.c. voltage which is to be effected by the on-load voltage regulator 7 may be effected at all times in such a manner that d.c. voltage ripples applied to the superconduction coil 1 may be reduced to a minimum value lying within a voltage range which allows the forward or reverse conversion operation of the thyristor conversion unit 2.

Thus, according to the present invention, the eddy current loss caused in the superconduction coil 1 during operation of the superconduction storage apparatus for electrical power may be reduced to a controllable minimum value, thus resulting in a reduced power consumption for cooling the superconduction coil 1 and in an improved operating efficiency of the superconduction power storage apparatus.

In addition, since the voltage to be applied to the coil 1 need not be controlled in its entirety by the thyristor conversion unit 2, it is also possible to suppress the wattless power produced in the superconduction power storage apparatus.

What is claimed is:

1. A superconduction power storage apparatus comprising a superconduction coil for storage and release of an electrical energy, a separately excited thyristor conversion unit having d.c. terminals connected to said superconduction coil and a.c. terminals connected to an a.c. power source, said conversion unit being arranged for converting said electrical energy from a d.c. form to an a.c. form and vice versa between said superconduction coil and said a.c. power source, and an on-load voltage regulator connected between said a.c. terminals of said thyristor conversion unit and said a.c. power source, said voltage regulator being arranged for adjusting the voltage appearing at said a.c. terminals of the thyristor conversion unit and said thyristor conversion unit being phase controlled so as to regulate its d.c. output voltage at its d.c. terminals, wherein said on-load voltage regulator regulates its a.c. output voltage at its a.c. output terminals.

* * * * *